US007537836B2

(12) United States Patent
Smith et al.

(10) Patent No.: US 7,537,836 B2
(45) Date of Patent: May 26, 2009

(54) GLASS LAMINATES HAVING IMPROVED STRUCTURAL INTEGRITY AGAINST SEVERE IMPACTS COMPRISING A FLEXIBLE ATTACHMENT

(75) Inventors: Charles Anthony Smith, Vienna, WV (US); David M. Rinehart, Montgomery, AL (US)

(73) Assignee: E.I. du Pont de Nemors and Company, Wilmington, DE (US)

( * ) Notice: Subject to any disclaimer, the term of this patent is extended or adjusted under 35 U.S.C. 154(b) by 131 days.

(21) Appl. No.: 11/015,956

(22) Filed: Dec. 16, 2004

(65) Prior Publication Data

US 2005/0202264 A1 Sep. 15, 2005

Related U.S. Application Data

(60) Provisional application No. 60/530,075, filed on Dec. 16, 2003.

(51) Int. Cl.
*B32B 17/10* (2006.01)

(52) U.S. Cl. ....................... 428/442; 428/436; 428/437; 428/441

(58) Field of Classification Search ................. 428/436, 428/437, 441, 442
See application file for complete search history.

(56) References Cited

U.S. PATENT DOCUMENTS

| | | | |
|---|---|---|---|
| 3,404,134 | A | 10/1968 | Rees |
| 4,004,388 | A | 1/1977 | Stefanik |
| 4,799,376 | A | 1/1989 | Siedlecki, Jr. et al. |
| 5,567,529 | A | 10/1996 | Smith et al. |
| 5,960,606 | A | 10/1999 | Dlubak |
| 6,737,151 | B1 | 5/2004 | Smith |
| 7,165,362 | B2 | 1/2007 | Jobs et al. |
| 2001/0023562 | A1 | 9/2001 | Blobaum et al. |
| 2003/0022015 | A1 | 1/2003 | Wong |
| 2003/0124296 | A1 | 7/2003 | Smith |
| 2004/0221526 | A1 | 11/2004 | Rinehart et al. |
| 2004/0234730 | A1 | 11/2004 | Rinehart et al. |
| 2004/0234731 | A1 | 11/2004 | Rinehart et al. |
| 2005/0042422 | A1 | 2/2005 | Bennison et al. |
| 2005/0118445 | A1 | 6/2005 | Wong et al. |
| 2005/0202264 | A1 | 9/2005 | Smith et al. |
| 2005/0233125 | A1 | 10/2005 | Anderson et al. |
| 2005/0266187 | A1 | 12/2005 | Smith et al. |
| 2006/0005482 | A1 | 1/2006 | Bennison et al. |
| 2006/0141212 | A1 | 6/2006 | Smith et al. |

FOREIGN PATENT DOCUMENTS

| | | | |
|---|---|---|---|
| EP | 0320674 | A | 6/1989 |
| EP | 0974451 | A | 1/2000 |
| GB | 708242 | A | 5/1954 |
| WO | WO98/28515 | | 7/1998 |
| WO | WO 99/58334 | | 11/1999 |
| WO | WO00/64670 | A | 11/2000 |
| WO | WO01/77039 | A | 10/2001 |

OTHER PUBLICATIONS

PCT International Search Report, PCT/US2004/043063, dated Dec. 16, 2004.

PCT International Preliminary Report on Patentability, PCT/US2004/043063, dated Nov. 9, 2005.

*Primary Examiner*—D. S Nakarani

(57) ABSTRACT

This invention comprises a glazing element having a transparent laminate secured to a structural support, and a process for preparing the same. The laminate comprises at least one layer of glass having self-adhered directly to the layer of glass a layer of thermoplastic polymer having low haze, wherein the layer of thermoplastic polymer is attached to the structural support along the edges of the laminate.

6 Claims, No Drawings

GLASS LAMINATES HAVING IMPROVED STRUCTURAL INTEGRITY AGAINST SEVERE IMPACTS COMPRISING A FLEXIBLE ATTACHMENT

This application claims the benefit of U.S. Provisional Application No. 60/530,075, filed Dec. 16, 2003, which is incorporated by reference herein for all purposes as if fully set forth.

BACKGROUND OF THE INVENTION

1. Field of the Invention

This invention relates to laminated glass structures. This invention particularly relates to laminated glass structures that can withstand severe impact.

2. Description of the Prior Art

Threat-resistant windows and glass structures are known. U.S. Pat. No. 5,960,606 ('606) and U.S. Pat. No. 4,799,376 ('376) each describes laminate windows that are made to withstand severe forces. In International Publication Number WO 98/28515 (IPN '515), for example, a glass laminate is positioned in a rigid channel in which a resilient material adjacent to the glass permits flexing movement between the resilient material and the rigid channel. Other means of holding glazing panels exist such as adhesive tapes, gaskets, putty, and the like can be used to secure panels to a frame.

Prior art windows and glass structures capable of withstanding hurricane-force winds and high force impacts are not trouble-free, however. For example, when subjected to severe hurricane forces the flexing movement in the windows of IPN '515, wherein glass flexes within a rigid channel, gradually pulls the laminate out of the channel resulting in loss of integrity of the structure. In '376, the glass held against the frame can be broken and crushed, causing a loss of structural integrity in the window/frame structure.

In U.S. Pat. No. 6,737,151 B1, incorporated herein by reference, glazing elements that are held in a window frame with the assistance of the interlayer are described. The interlayer provides the means for attachment to the frame. In some circumstances, it can be desirable or even advantageous to use a more flexible material to attach the glazing in the frame. However, flexible thermoplastic materials that have the optical properties suitable for use as an interlayer may not have the modulus or tear strength required for the strenuous applications of threat resistant glazing.

SUMMARY OF THE INVENTION

In one aspect, the present invention is a glazing element comprising a transparent laminate and a support structure attached to the laminate, the laminate comprising at least one layer of glass bonded to an interlayer of a thermoplastic polymer having low haze, wherein the polymeric interlayer is exposed in such a manner as to allow for attachment of the laminate to the support structure, and wherein the laminate is attached to the support structure by way of the polymeric interlayer, which is in turn attached to a composite material comprising (1) an interlayer-compatible material and (2) a flexible attachment.

DETAILED DESCRIPTION

It has now been found that attaching an interlayer (an intervening plastic layer in a glass laminate) to a support structure provides glazing elements with improved integrity. The glazing element of this invention comprises a support structure supporting a glazing structure, wherein the glazing structure comprises a laminate of at least one layer of glass and at least one thermoplastic polymer layer that is self-adhered directly to at least one surface of the glass. In the practice of the present invention, the interlayer sheet has a high modulus, excellent tear strength and excellent adhesion directly to glass. Preferably the thermoplastic polymer layer is a particular ionomer resin.

In the practice of the present invention the periphery of the laminate interlayer is attached by way of an attachment means to a structure that supports the laminate glazing structure (hereinafter support structure). The support structure can be a frame, a building, bolts, screws, wires, cables, nails, staples, clamps, loops, rivets, a combination of any of these, or any other conventional means for supporting a glazing element. Attachment of the interlayer to the support can be from the top, sides, bottom, or through the interlayer material. While it is preferred that the support structure is a frame that surrounds the glazing structure, other support structures or means are not necessarily excluded.

A laminate of the present invention has excellent durability, impact resistance, toughness, and resistance to cuts by glass. A laminate of the present invention is particularly useful in architectural applications in buildings subjected to hurricanes and wind storms and also as side windows for automobiles and trucks that can be subjected to the repeated attacks by a person attempting to break into the vehicle. A laminate of the present invention that is attached to the frame by way of the interlayer can withstand such stress or attack without being torn away from the frame. A laminate of the present invention also has a low haze and excellent transparency. These properties make it particularly useful as architectural glass, including in applications wherein the reduction of solar rays, sound control, safety, and security, for example, are important.

In one embodiment, a laminate of the present invention comprises at least one layer of glass having self-adhered directly to a surface of the glass an interlayer formed from a thermoplastic polymer having low haze, wherein the outer edges of the interlayer polymer are attached to a surrounding frame. In the process of the present invention the laminate is anchored to the frame by way of the interlayer, which is exposed in such a manner as to allow for attachment of the laminate to the supporting structure.

The interlayer is positioned between the glass plates such that the interlayer is exposed in such a manner that it can be attached to the surrounding frame. The interlayer can be attached to the support structure in either a continuous manner along the perimeter of the laminate. The interlayer can be attached to the structural support in a discontinuous manner at various points around the perimeter of the laminate. Any manner of attaching the laminate to the frame by way of the interlayer is considered to be within the scope of the present invention. For example, the frame surrounding the laminate can contain interlayer material that can bond with the glass surface of the laminate and also with the frame; the interlayer can be mechanically anchored to the frame with a screw, hook, nail, or clamp, for example. Mechanical attachment includes any physical constraint of the interlayer by slotting, fitting, or molding a support to hold the interlayer in place within the structural support. The interlayer can be chemically bonded to the frame with an adhesive material, or by using any combination of mechanical and/or chemical means.

Air can be removed from between the layers of the laminate, and the interlayer can be bonded, or adhered, to the glass plates by applying heat and pressure to the structure. In a preferred embodiment, the interlayer can be bonded without applying increased pressure to the structure.

One preferred laminate of this invention is a transparent laminate of two layers of glass with an intermediate thermoplastic polymer interlayer self-adhered to at least one of the glass surfaces.

In one preferred embodiment, the interlayer of the laminate is a sheet of an ionomer resin, wherein the ionomer resin is a water insoluble salt of a polymer of ethylene and methacrylic acid or acrylic acid, containing about 14-24% by weight of the acid and about 76-86% by weight of ethylene. The ionomer further characterized by having about 10-80% of the acid neutralized with a metallic ion, preferably a sodium ion, and the ionomer has a melt index of about 0.5-50. Melt index is determined at 190° C. according to ASTM D1238. The preparation of ionomer resins is disclosed in U.S. Pat. No. 3,404,134. Known methods can be used to obtain an ionomer resin with suitable optical properties. For example, it is known that increasing the acid content of an ionomer resin can result in improved clarity of the resin.

In another preferred embodiment, the present invention comprises plasticized polyvinylbutyral having a modulus that is stiff enough to be used in the practice of this invention. A suitable PVB interlayer can comprise at least one sheet having a $T_g$ of greater than 30° C.

Haze and transparency of laminates of this invention are measured according to ASTM D-1003-61 using a Hazegard XL211 hazemeter or Hazeguard Plus Hazemeter (BYK Gardner-USA). Percent haze is the diffusive light transmission as a percent of the total light transmission. To be considered suitable for architectural and transportation uses. The interlayer of the laminates generally is required to have a transparency of at least 90% and a haze of less than 5%.

Further improvement can be obtained by selectively orienting the glass surface of the laminate in the direction from which the extreme force is applied. Glass used in laminated glazing structures can be made by the well-known and conventional float glass method, wherein molten glass is cast onto the surface of a liquid tin bath. The surfaces of glass made in this manner are commonly referred to as having a tin-side and an air-side. Orienting the layers of glass such that the tin sides are bonded to the thermoplastic polymer interlayer can reduce glass spalling and removal of glass upon stress or impact.

In constructing the glazing element, it may be most convenient to laminate the glass layer(s) and interlayer using sheets of the same surface dimensions. The edges of the interlayer can be extended past the periphery of the laminate. The interlayer can be attached to a frame, for example, by positioning a strip of interlayer material along the periphery of the laminate. Alternatively, a strip of the interlayer material can be positioned inside the frame, with the strip and edges of the interlayer material in contact. During the laminating process the materials contact each other and adhere to each other when heated.

For the purposes of this application, when the thermoplastic polymer layer is said to be self-adhered directly to glass, this means that there is no intermediate layer between the thermoplastic polymer layer and the glass. For example, there is no primer or thin adhesive layer between the glass and the thermoplastic polymer layer, nor has the surface of the glass or thermoplastic layer been specially treated.

Standard techniques can be used to form the resin interlayer sheet. For example, compression molding, injection molding, extrusion and/or calendaring can be used. Preferably, conventional extrusion techniques are used. In a typical process, an ionomer resin suitable for use in the present invention can include recycled ionomer resin as well as virgin ionomer resin. Additives such a colorants, antioxidants and UV stabilizers can be charged into a conventional extruder and melt blended and passed through a cartridge type melt filter for contamination removal. The melt can be extruded through a die and pulled through calendar rolls to form sheet about 0.38-4.6 mm thick. Typical colorants that can be used in the ionomer resin sheet are, for example, a bluing agent to reduce yellowing or a whitening agent or a colorant can be added to color the glass or to control solar light.

The ionomer resin sheet after extrusion can have a smooth surface but preferably has a roughened surface to effectively allow most of the air to be removed from between the surfaces in the laminate during the lamination process. This can be accomplished for example, by mechanically embossing the sheet after extrusion or by melt fracture during extrusion of the sheet and the like.

The laminate can be prepared according to conventional processes known in the art. In a typical process, the interlayer is placed between two pieces of annealed float glass of dimension 12"×12" (305 mm×305 mm) and 2.5 mm nominal thickness, which have been washed and rinsed in demineralized water. The glass/interlayer/glass assembly is then heated in an oven set at 90-100° C. for 30 minutes. Thereafter, it is passed through a set of nip rolls (roll pressing) so that most of the air in the void spaces between the glass and the interlayer may be squeezed out, and the edge of the assembly sealed. The assembly at this stage is called a pre-press. The pre-press is then placed in an air autoclave where the temperature is raised to 135° C. and pressure to 200 psig (14.3 bar). These conditions are maintained for 20 minutes, after which, the air is cooled while no more air is added to the autoclave. After 20 minutes of cooling when the air temperature in the autoclave is less than 50° C., the excess air pressure is vented.

In a preferred embodiment, a glass sheet, an ionomer resin sheet and a second glass sheet can be laminated together using heat, pressure, and vacuum to remove air. The edges of the resin sheet can be extended into the frame by including a strip of resin sheet in the frame from each edge of the glass. The ionomer resin sheet can be positioned between two glass plates under a vacuum (a vacuum bag or vacuum ring can be used), and can be heated from about 25 to about 135° C. to obtain an assembly. The assembly is held at this temperature for from about 15 minutes to about 2.0 hours and then cooled to ambient temperature, generally to about 25° C. or less. In this process the edges of the resin sheet can be fused with the resin sheet in the frame creating a monolithic structure. Alternatively, the glass sheets and the ionomer can be laminated according to the same process, except that ambient atmospheric pressure is used.

For architectural uses and for uses in transportation applications such as automobiles, trucks and trains, a laminate can have two layers of glass and, self-adhered to the glass, an interlayer of a thermoplastic polymer. A laminate of the present invention can have an overall thickness of about 3-30 mm. The interlayer can have a thickness of about 0.38-4.6 mm and each glass layer can be at least 1 mm thick. In a preferred embodiment, the interlayer is self-adhered directly to the glass, that is, an intermediate adhesive layer or coating between the glass and the interlayer is not used. Other laminate constructions can be used such as, for example, multiple layers of glass and thermoplastic interlayers; or a single layer of glass with a thermoplastic polymer interlayer, having adhered to the interlayer a layer of a durable transparent plastic film. Any of the above laminates can be coated with conventional abrasion resistant coatings that are known in the art.

The frame can be fabricated from a variety of materials such as, for example: wood; aluminum; steel; and various strong plastic materials including polyvinyl chloride and nylon. Depending on the material used and the type of installation, the frame may or may not be required to overlay the laminate in order to obtain a fairly rigid adhesive bond between the frame and the laminate interlayer.

The frame can be selected from the many available frame designs in the glazing art, with the requirement that the interlayer can be secured to the frame. The interlayer can be attached, or secured, to the frame with or without use of an adhesive material. It has been found that an interlayer made from ionomer resin self-adheres securely to most frame materials, such as wood, steel, aluminum and plastics. In some applications it may be desirable to use additional fasteners such as screws, bolts, and clamps along the edge of the frame. Any means of anchoring the interlayer to the frame is suitable for use in the present invention.

An interlayer of the present invention has a Storage Young's Modulus of from about 50 to about 1,000 MPa (mega Pascals) and preferably form about 100 to about 500 MPa, as determined according to ASTM D 5026-95a. The interlayer should remain in the 50-1,000 MPa range of its Storage Young's Modulus at temperatures up to 40° C.

In preparing the glazing elements of this invention, autoclaving can be omitted. Steps well known in the art such as roll pressing (1), vacuum ring or bag pre-pressing (2), or vacuum ring or bagging (3), can be used to prepare the laminates of the present invention. The layers are brought into intimate contact and processed into a final laminate, which is free of bubbles and has good optics and adequate properties to insure laminate performance over the service life of the application. In these processes the objective is to squeeze out or force out a large portion of the air which is between the glass and plastic layer(s). In one embodiment the frame can serve as a vacuum ring. The application of external pressure, in addition to driving out air, brings the glass and plastic layers into direct contact and adhesion develops.

In a particularly preferred embodiment, the interlayer of the laminate can be bonded to a composite material comprising a fabric or mesh (hereinafter, mesh) comprising at least one polymer or other material that is compatible with the interlayer. By compatible, it is meant that the interlayer and the compatible material can be adhesively bonded to one another to form strong adhesively connected mass. The compatible material can be any material that can bond with the interlayer material and give the type of adhesive strength necessary to withstand pressures from the weight of the laminated and stresses of use as part of a glass laminate glazing structure. The mesh contemplated as suitable for use in the present invention is a flexible material that has sufficient structural integrity to remain intact against forces exerted by the weight of the laminate, or other forces resulting from use as part of a glass laminate glazing structure. The mesh can be made from materials selected from the group consisting of: metals or metal composites such as aluminum, copper, tin, and steel for example; natural fabrics such as cotton, wool, and burlap; synthetic polymers such as polyethylene, polypropylene, polyamides, polyesters, aramides, for example; or fiberglass, carbon fiber and the like. Preferred are aramides such as is available from E. I. DuPont de Nemours and Company under the trade name of Kevlar®. A flexible mesh material can be impregnated with the compatible polymer to form the flexible composite of the present invention. The composite can be attached to the interlayer at one point and at another point on the composite the frame or support structure or another attachment means can be used to hold the flexible composite and thereby hold the laminate into the desired position.

The attachment can be made by joining the flexible attachment to the interlayer in any conventional manner, or any manner that is effective in bonding the flexible attachment to the laminate. For example, the flexible attachment can be joined by mechanical or means such as with screws bolts, clamps, pins, staples, or ties, for example. Alternatively, the attachment can be joined with the interlayer using physical and/or chemical means, such as by using an adhesive or altering the surface to create a chemical adhesion between the attachment and the interlayer. Alternatively, the interlayer and mesh can be joined by heating the interlayer such that it softens or preferably flows into and/or around the attachment to form a physical/mechanical bond.

Various methods can be used independently or in combination to join the flexible attachment and the interlayer, but it is preferable that the step of joining the attachment to the interlayer can be done in no more time than it takes to laminate the glass sheets to the interlayer. Preferably, the joining step takes less than 1 hour, more preferably the joining step takes less than 30 minutes, and most preferably the joining step takes less than 20 minutes.

In a preferred embodiment, the joining step is carried out in a thermal process, by contacting the interlayer with a heated element while it is in contact with the flexible material.

The Examples are for illustrative purposes only, and are not intended to limit the scope of the invention.

EXAMPLES

General Lamination Procedure

Glass and ionomer laminates were prepared using the following procedures: Glass sheets (3 mm thick—annealed) 2" wide by 10" length were washed with deionized water and dried. Ionomer resin sheeting (2.3 mm) thick with a surface texture was laid between the two lites of glass. Some laminates in these examples used 1 layer and some were prepared with 2 layers of 90 mil (2.3 mm) thick interlayer of an ionomer resin composed of 81% ethylene, 19% methacrylic acid, 37% neutralized with sodium ion and having a melt index of 2 and 2 layers of glass, each 10 mm in thickness. The ionomer resin is available as Surlyn® ionomer resin made by E. I. du Pont de Nemours and Company.

Example 1

No flexible edge attachment was added. The laminate was laid between two neoprene rubber gaskets (80 Shore Hardness A) each having a one inch width by 0.5 inch contact area with the perimeter edges of both of the laminate surfaces to simulate a conventional gasket-glazed or 'dry-glazed' installation.

Example 2

An aluminum metal angle 0.5"×0.5"×0.125" was bonded to the edge of the laminate by first placing a strip of the ionomer resin sheet between the edge of the laminate and inside surface of the angle.

Example 3

Kevlar® polyaramide webbing or mesh, having an arial density of xxx, approximately 0.015" in thickness was placed in contact with ionomer resin (also 0.015" in thickness) along two parallel regions (about 1 inch in width by the length of the material) and separated by approximately 2 inches. This assembly was heated to join the resin and mesh together. The resulting composite structure was tested for tensile strength.

Example 4 was prepared by allowing the ionomer/mesh composite above to be placed in contact with a portion of an ionomer resin 'interlayer' of a glass/ionomer laminate. One lite of the glass sample was 0.8 inches shorter, thereby exposing a substantial portion of the ionomer resin 'interlayer' of the sample such that 0.8 square inches of contact area was made and tensile force was applied to the sample, to simulate a 'lap-shear' test. The glass in the sample self-fractured and elongation of the resulting fractured glass laminate occurred.

Example 5 was prepared by taking the same composite as in Example 3 and bonding by heating with some application of pressure to the laminate edge to the portion of the ionomer resin interlayer that normally would present itself in a standard laminate configuration. The laminate in this case had 0.180 inch thick interlayer.

Example 6 through Example 9 were all prepared in the same manner as Example 5 except that all of the laminates had 0.09 inch thick interlayer.

Example 10 was prepared in a similar manner to Examples 6 through 9 with the exception that the mesh was oriented at a 45 degree bias from all of the other samples, which had been oriented such that the one weave direction was 'normal' to the edge of the laminate and the other was parallel (90 & 0 degrees respectively). Example 10 was placed at a (45, 45 degree) bias weave direction.

Laminates were placed in a vacuum-bag and vacuum applied to remove air from the laminate spaces and the laminates were then placed into an air autoclave at 220 PSIG (1.6 MPa) pressure at 135° C. for 90 minutes.

A tensile test was performed to measure the strength and integrity of the attachment. The testing was conducted on samples having dimensions of either 1 or 2 inches by 10 inches. One end of each sample was rigidly held by clamping into a holding fixture and the other end was attached to the load cell. Several different configurations were utilized to assess the mechanical properties of the composite webbing and their integrity with the laminated samples. This will be described further with respect to each sample. The tensile testing rate was 3 inches/minute and data was collected via a calibrated load cell and displacement potentiometer. The data was then collected by a data acquisition system for graphing and data treatment.

Example 2 was tensile tested using a C-shaped metal clamp which could interlock with the aluminum angle so that the force-displacement properties could be measured.

In Example 3, clamping was done at both ends so that no slippage could occur and that failure would be represented by tearing of the material.

In Examples 4 through 6 both ends were clamped to avoid any possible slippage.

Example 7 was tensile tested by forming a loop of the webbing material around a steel rod such that retention was achieved mechanically rather than by clamping action.

The sample of Example 8 was tested by placing four 0.25 inch steel pins through the webbing material along the lines of representing a rivet, nail, screw or similar and standard retention means.

The sample of Example 9 was tested by bonding an additional strip of ionomer resin on the out-board edge (parallel to the glazing). A steel C-clamping arrangement was created with a slot of 0.05 inch width by 2 inches length. The webbing material was slid into this slot with the thicker section of the webbing material being constrained. T The sample of Example 10 was tested by being held in the same manner as the sample of Example 9.

Examples 11 and 13 are larger samples (5' by 5') prepared by the same general process outlined above except the glass was 6 mm heat-strengthened and one layer of 2.3 mm (90 mil) ionomer resin sheet was utilized as the laminate interlayer. The glass size was 61 inches by 120 inches and the laminates were produced by a conventional autoclave process (135° C./60 minutes soak time). A Kevlar®/ionomer resin webbing was produced as strips approximately 3" wide by 50" in length. The webbing material was backed with thin aluminum foil (0.002" thickness). A contact heating tool (temperature at 170 C over a flat metal surface 10 inches in length) was placed in contact with the foil side of the webbing to provide enough heat to create a melt fusion bond between the ionomer resin carried on the Kevlar® webbing material and the ionomer resin material of the glazing element. Bonding time in this case was about 3 inches per minute traverse speed. Higher temperatures were not explored due to increased chance of initiating thermal glass breakage. The placement of the edge of the webbing was flush with the surface of the outboard surface of the laminate and then extended as a flap almost 2.5 inches beyond the inboard surface of the glass. The flexibility of the webbing then allowed for placement of the unattached 'flap' end to be positioned underneath an extruded aluminum 'pressure-plate' used conventionally in the glazing industry to assemble glazing units and to provide mechanical strength and a weatherseal. The pressure plate was attached to the mullion beneath with self-tapping #8 machine screws located on 8 inch centers.

Attached hereto are examples of a product trial using Kevlar® mesh impregnated with ionomer material, which is captured by a conventional framing system and tested against applied force. The flexible attachment of the present invention allowed the laminate to actually stretch in some cases rather than snap or break.

TABLE 1

| Example | Description | Edge Contact Area (inches^2) | Tensile Force (pounds-inch) | Elongation (inches) |
|---|---|---|---|---|
| 1 | Std. Gasket glazing | 0 | 14 | 0 |
| 2 | Metal Angle | 0.52 | 89 | 0.23 |
| 3 | Flexible Mesh | N/a | 611 | 1.53 |
| 4 | Flexible Mesh/Laminate | 0.8 | 420 | 6.9* |
| 5 | Flexible Mesh/Laminate | 0.18 | 330 | 0.49 |
| 6 | Flexible Mesh/Laminate | 0.090 | 197 | 0.31 |
| 7 | Flexible Mesh/Laminate | 0.090 | 188 | 0.30 |
| 8 | Flexible Mesh/Laminate | 0.090 | 201 | 0.33 |
| 9 | Flexible Mesh/Laminate | 0.090 | 212 | 0.35 |
| 10 | Flexible Mesh/Laminate | 0.090 | 181 | 0.82 |

Note*:
Applied stress caused laminated glazing element to self-initiate glass fracture and Elongation of sample occurred. No failure between flexible attachment and glazing observed.

| Example | Description | Edge Capture | Cycling Pressure | Test Result |
|---|---|---|---|---|
| 11 | Std. Glazed | 14 mm | 50 psf | Failed—Edge Pullout |
| 12 | Flexible Attachment | 14 mm | 150 psf | Passed—9000 cycles |
| 12[a]—Stressed | Continued testing from above | | 175 psf | Failed by Edge Pullout—Bond between Flexible attachment and laminate edge |

[a]The laminate of Ex 12 was processed through a hurricane cycling procedure described in U.S. Pat. No. 6,737,151 B1.

What is claimed is:

1. A glazing element comprising:

a transparent laminate comprising at least one layer of glass bonded to an interlayer of an ionomer resin having low haze, a portion of the ionomeric interlayer being exposed, wherein said ionomer resin consists essentially of a water insoluble sodium salt of a polymer of ethylene and methacrylic acid or acrylic acid containing 14-24% by weight of the acid and having about 10-80% by weight of the acid neutralized with sodium ion and the ionomer resin has a melt index of about 0.5-50 grams/10 min; and a composite attachment connected between the laminate and a support structure, the composite attachment comprising a flexible mesh wherein at least a portion thereof is substantially entirely impregnated with a ionomeric material that is compatible with the interlayer, the portion of the flexible mesh impregnated with the ionomeric material being bonded to a predetermined length of the exposed portion of the interlayer thereby to form a strong adhesively connected mass, wherein the composite attachment having the impregnating ionomeric material undergoes an elongation of no more than about 0.5 inches when a tensile force-per-bonded-length in the range from about two hundred to about three hundred fifty pounds-inch is imposed on the composite attachment.

2. The glazing element of claim 1 wherein the interlayer has a dimension that is greater than the dimension of the glass such that the exposed portion of the interlayer defines a planar surface having a planar dimension that is greater than its thickness, and wherein the portion of the flexible mesh impregnated with the ionomeric material is facially bonded to the planar exposed portion of the interlayer.

3. The glazing element of claim 1 wherein the interlayer and the glass each have an edge, and wherein the edges of the interlayer and the glass are aligned with each other such that the edge of the interlayer defines the exposed portion of the interlayer, and wherein the portion of the flexible mesh impregnated with the ionomeric material is bonded to the edge of the interlayer.

4. The glazing element of claim 1 wherein the flexible mesh is fabricated from a polyaramide material.

5. The glazing element of claim 1 wherein the flexible mesh has a warp component and a weft component, wherein one of the components extends parallel to the exposed portion of the interlayer and the other component extends perpendicular to the exposed portion of the interlayer.

6. The glazing element of claim 1 wherein the flexible mesh has a warp component and a weft component, wherein both of the components extend at an angle of about forty-five degrees with respect to the exposed portion of the interlayer.

* * * * *